US012744398B2

(12) United States Patent
Wang

(10) Patent No.: US 12,744,398 B2
(45) Date of Patent: Sep. 22, 2026

(54) CHARGING CASE CAPABLE OF LIGHTING UP AUTOMATICALLY

(71) Applicant: Finemold Technologies Co., Ltd, Shenzhen (CN)

(72) Inventor: Baohong Wang, Shenzhen (CN)

( * ) Notice: Subject to any disclaimer, the term of this patent is extended or adjusted under 35 U.S.C. 154(b) by 566 days.

(21) Appl. No.: 18/374,694

(22) Filed: Sep. 29, 2023

(65) Prior Publication Data

US 2025/0112478 A1 Apr. 3, 2025

(51) Int. Cl.
*H02J 7/70* (2026.01)
*G01K 1/08* (2021.01)
*H02J 7/82* (2026.01)

(52) U.S. Cl.
CPC ................ *H02J 7/731* (2026.01); *G01K 1/08* (2013.01); *H02J 7/825* (2026.01); *G01K 2215/00* (2013.01)

(58) Field of Classification Search
CPC ........ G01K 1/08; G01K 2215/00; H02J 7/731
See application file for complete search history.

(56) References Cited

U.S. PATENT DOCUMENTS 11,431,185 B1 * 8/2022 Feng ......................... H02J 7/00

FOREIGN PATENT DOCUMENTS

CN 214479688 U 10/2021

* cited by examiner

*Primary Examiner* — Robert Grant
(74) *Attorney, Agent, or Firm* — Abd Almonem Doolaanea

(57) ABSTRACT

A thermometer charging case capable of lighting up automatically is provided. The thermometer charging case includes: a bracket configured to hold a thermometer; an upper shell arranged above the bracket and configured to cover the bracket; and a lower shell arranged below the bracket; wherein a circuit board is further arranged between the bracket and the lower shell, and an indicator light and a magnetic induction switch are further arranged on the circuit board; a magnet is further arranged on a lower side of the upper shell at a position corresponding to the magnetic induction switch; in a case where the upper shell is closed downward, the magnet is close to the magnetic induction switch; in a case where the upper shell is opened upward, the magnet is away from the magnetic induction switch.

10 Claims, 7 Drawing Sheets

CHARGING CASE CAPABLE OF LIGHTING UP AUTOMATICALLY

TECHNICAL FIELD

The present invention relates to the technical field of charging cases, in particular to a thermometer charging case capable of lighting up automatically.

BACKGROUND

The charging case is multifunctional because it can not only be used as a storage case for an electronic charging case, but also can serve as an electronic charging case for charging. Therefore, the charging case is more and more widely used.

At present, the charging case usually adopts an indicator light to show whether the charging case is in a charging state. For example, Chinese Patent CN202120154437.6 provides a charging case which cannot display the remaining battery level in multiple levels, and cannot achieve the effect of displaying the remaining battery level when the lid is opened and the effect of lighting out when the lid is closed, thus causing light pollution at night.

The thermometer charging case capable of lighting up automatically is a charger that can automatically sense the surrounding light. By detecting the intensity of the surrounding light, it can automatically adjust the charging state to ensure that the battery is fully charged. Such charging cases typically have two main parts: a light sensor and a charging circuit board. The light sensor is responsible for detecting the intensity of the surrounding light and transmitting a signal to the charging circuit board. The charging circuit board automatically adjusts the charging state according to the light intensity detected by the light sensor to ensure that the battery is fully charged. The thermometer charging case capable of lighting up automatically is commonly used in devices, such as electric vehicles and solar panels, to better manage the charging of batteries.

Fault diagnosis of the thermometer charging case capable of lighting up automatically cannot be realized in the current prior art.

Therefore, there are deficiencies in the prior art and it needs to be further improved.

SUMMARY

Aiming at the problems existing in the prior art, the present invention provides a thermometer charging case capable of lighting up automatically. In the present invention, a fault diagnosis module is arranged on a circuit board to convert the macroscopic state of the charging case during operation into a microscopic thinking, so as to improve the computing capability of data information and the evaluation capability of the charging case.

For achieving the above objective, the specific solution of the present invention is as follows:

The present invention provides a thermometer charging case capable of lighting up automatically, including:

a bracket configured to hold a thermometer;

an upper shell arranged above the bracket and configured to cover the bracket; and a lower shell arranged below the bracket; and wherein a circuit board is further arranged between the bracket and the lower shell, and an indicator light and a magnetic induction switch are further arranged on the circuit board; a magnet is further arranged on a lower side of the upper shell at a position corresponding to the magnetic induction switch;

in a case where the upper shell is closed downward, the magnet is close to the magnetic induction switch, the magnetic induction switch is turned off, and the indicator light is out;

in a case where the upper shell is opened upward, the magnet is away from the magnetic induction switch, the magnetic induction switch is turned on, and the indicator light is on. The circuit board is provided with a fault diagnosis module, and the fault diagnosis module includes:

a vibration sensor, configured to measure a vibration signal of a charging case body, an input end of the vibration sensor being connected to a drive charging case of the charging case body, wherein an original mechanical quantity to be measured of the charging case body is used as an input quantity of the vibration sensor, and is then received by a mechanical receiving port to form another mechanical quantity suitable for conversion, and finally, the electromechanical conversion part converts the other mechanical quantity into electricity;

an electrical sensor, configured to measure an electrical signal of the charging case body, the electrical sensor including an energy storage circuit and a detection circuit, one end of the energy storage circuit being configured to receive an output voltage, current and power of a generator of the charging case body, the detection circuit being connected to the other end of the energy storage circuit and outputting a detection voltage in response to detecting the control of the generator;

a feature extraction module, configured to extract features of the electrical signal and the vibration signal, and combine the features to determine fault diagnosis parameters of the charging case body;

a computing module, configured to compute a signal frequency range and obtain fault diagnosis data of the charging case body, the computing module adopting an improved filtering wavelet algorithm based on an uncertainty matrix theory to realize a particle filtering state estimator of the charging case body and evaluating the fault of the charging case according to a difference between an estimated value and an actual value of a state variable; and a communication module configured to transmit the fault diagnosis data of the charging case body to a remote user mobile phone end by way of Zigbee wireless communication;

wherein an output end of a power train device in the charging case body is connected to the input end of the vibration sensor, an output end of the generator in the charging case body is connected to an input end of the electrical sensor, an output end of the vibration sensor is connected to an input end of the feature extraction module, an output end of the electrical sensor is connected to the input end of the feature extraction module, the output end of the feature extraction module is connected to an input end of the computing module, and the output end of the computing module is connected to an input end of the communication module.

Further, the indicator light includes: a charging indicator light and battery level indicator lights;

the charging indicator light is configured to show whether charging is in progress; the charging indicator light is on in a case of charging and the charging indicator light is off in a case of full battery;

three battery level indicator lights are provided to respectively display three battery levels of 1/3, 2/3, and 3/3.

Further, an upper surface of the bracket is further provided with a placement slot for placing a thermometer;

one side of a charging slot is provided with a charging elastic sheet electrically connected to the circuit board to charge the thermometer;

the other side of the charging slot is further provided with an ultraviolet disinfection lamp for sterilizing and disinfecting the thermometer.

Further, an iron post is further arranged on the bracket at a position corresponding to the magnet arranged on the upper shell and is configured to magnetically attract a case lid.

Further, an elastic sheet is further arranged in the placement slot to fix the thermometer.

Further, the upper shell is rotatably installed on the bracket through a rotating shaft.

Further, the circuit board is further provided with a charging interface, and at a corresponding position on a side wall of the lower shell, a strip-shaped opening is formed for connection with a power supply.

Further, the placement slot is thin in the middle and thick at two ends, and the elastic sheet is installed at the thin part in the middle and is thick at two ends, which is convenient for taking and placing the thermometer;

a probe is connected to the charging case via Bluetooth, and a mobile phone is connected to a repeater via Bluetooth.

The feature extraction module includes a reading module, a sampling module, a dividing module, a construction module and a fusion module, wherein the reading module reads electrical signals and vibration signals from a data set, converts the electrical signals and the vibration signals into electrical data and vibration data through A/D conversion to obtain a class label included in each piece of data; the sampling module randomly samples the class labels included in the data obtained by the reading module to obtain a feature template; the dividing module translates and rotates template point clouds obtained by the sampling module to obtain source point clouds, and divides the source point cloud and the template point cloud into a training set and a test set according to the class labels of the point clouds; the construction module computes loss functions based on respective point cloud registration models of the electrical data and the vibration data; the fusion module fuses the electrical data loss function and the vibration data loss function to obtain the fault diagnosis parameters of the charging case body.

The improved filtering wavelet algorithm based on the uncertainty matrix theory includes the following steps:

step 1, constructing a mathematical model of uncertainty matrix theory:

$$C = \begin{pmatrix} C_1 \\ C_2 \end{pmatrix}_{(J+K)*N} \tag{1}$$

in equation (1), C represents the total matrix of the mathematical model of the uncertainty matrix theory, and $C_1$ and $C_2$ represent some of the matrices in the uncertainty matrix theory model, specifically:

$$C_1 = \begin{pmatrix} D_{11} & D_{12} & \dots & D_{1N} \\ D_{21} & D_{22} & \dots & D_{2N} \\ \vdots & \vdots & \vdots & \vdots \\ D_{J1} & D_{J2} & \dots & D_{JN} \end{pmatrix}_{J*N} \tag{2}$$

$$C_2 = \begin{pmatrix} L_{11} & L_{12} & \dots & L_{1N} \\ L_{21} & L_{22} & \dots & L_{2N} \\ \vdots & \vdots & \vdots & \vdots \\ L_{K1} & L_{K2} & \dots & L_{KN} \end{pmatrix}_{K*N} \tag{3}$$

where $\{D_1, D_2, D_3 \dots D_J\}$ in $C_1$ indicates a data set composed of elements that affect the charging case, D indicates one of the elements in the data set, the subscript indicates a serial number, it is set that there are J elements of the charging case, which are magnetic field, operating environment and weather, and N represents the number of pieces of data; $\{L_1, L_2, L_3 \dots L_K\}$ in $C_2$ represents a data set composed of elements that affect the charging case body, K represents one of the elements in the data set, and it is set that there are k elements of the charging case body;

step 2, during the process of looking for factors that affect the working state of the charging case body, associating the two sets and observing the similarities or differences to determine the elements that affect the charging case body; setting a probability density function of fault state data information of the charging case body at time t−1 as $P(x_{t-1}|y_{t-1})$, and sampling N particles with a value of $$x_{t-1}^{(i)}$$

and a weight of $$w_{t-1}^{(i)}$$

to generate a new particle used to estimate the prediction probability density $P(x_t|y_{t-1})$ of the fault state data information of the charging case body, wherein the new particle is expressed as:

$$x_{t|t-1}^{(i)} = f\left(x_{t-1}^{(i)}, w_{t-1}^{(i)}\right) \tag{4}$$

in equation (4), $$x_{t-1}^{(i)}$$

represents the value of an i-th particle at time t−1, $$w_{t-1}^{(i)}$$

represents the weight of the i-th particle at time t−1, and in a state update stage, based on historical observation values, the state at time t is predicted and after the latest observation value $y_t$ is obtained, the weight of the particle is determined and expressed as:

$$w_t^{(i)} = \frac{p(y_t \mid x_{t|t-1}^{(i)})}{\sum_{j=1}^{N} p(y_t \mid x_{t|t-1}^{(i)})} \quad (5)$$

in equation (5), $$P(y_t|x_{t|t-1}^{(t)})$$

represents a likelihood function;

step 3, resampling particles, wherein in the resampling stage, the particles are resampled according to the weights of the particles, the particles with large weights are retained, the particles with small weights are removed, the degradation of the particles is reduced, the weight of the particle after resampling is 1/N, and an estimated value of the current state variable is expressed as:

$$x_t = \frac{1}{N}\sum_{i=1}^{N} Z_t^{(i)} \quad (6)$$

in equation (6), $$Z_t^{(i)}$$

represents the value of a particle at time t; through a particle filtering process, the particle filtering state estimator of the charging case body is realized, and the difference between the estimated value and the actual value of the state variable is used to warn the fault of the charging case body, a variable residual is expressed as:

$$r_t^{(i)} = y_t^{(i)} - x_t^{(i)} \quad (7)$$

in equation (7), $$y_t^{(i)}$$

represents the actual measured value of the state variable, $$x_t^{(i)}$$

represents the estimated value by particle filtering, and a multi-state variable residual is used as a fault warning indicator, which is expressed as:

$$r_t = \left|\sum_{l=1}^{m} (r_k^{(l)})\right| \quad (8)$$

in formula (8), $$r_k^{(l)}$$

represents a state residual; and step 4, in a case where the charging case is operating normally, since some state variables are affected by load changes and the amplitude of the vibration signal is affected by a load current on a charging case conductor, the state variable residual may not be 0, which reduces errors and noise interference to the greatest extent, in a case where a fault occurs at time $t_A$, if a constant-threshold method is used, an alarm signal will be sent out at time $t_B$, resulting in false alarms. However, using an adaptive-threshold method can effectively prevent other interference factors from affecting the change of variable residuals, thereby ensuring that the fault alarm function of the charging case is more accurate; the confidence and confidence level of the adaptive threshold satisfy:

$$p\{\overline{\mu} - z\alpha < \mu < \overline{\mu} + z\alpha\} = 1 - \alpha \quad (9)$$

in equation (9), a represents the confidence level, 1-α represents the confidence, and Z represents a correlation coefficient.

By adoption of the technical solution of the present invention, the following beneficial effects are brought about:

1. The indicator light is on when the lid is opened, and the indicator light is off when the lid is closed, thereby saving power, and preventing light from affecting sleep at night.
2. Multi-level display brings about convenience for users to determine the battery level; and
3. The magnetic lid used to replace a mechanical structure is more durable.

In the present invention, a fault diagnosis module is arranged on a circuit board to convert the macroscopic state of the charging case during the operation into a microscopic thinking, so as to improve the computing capability of data information and the evaluation capability of the charging case.

Figure 1:
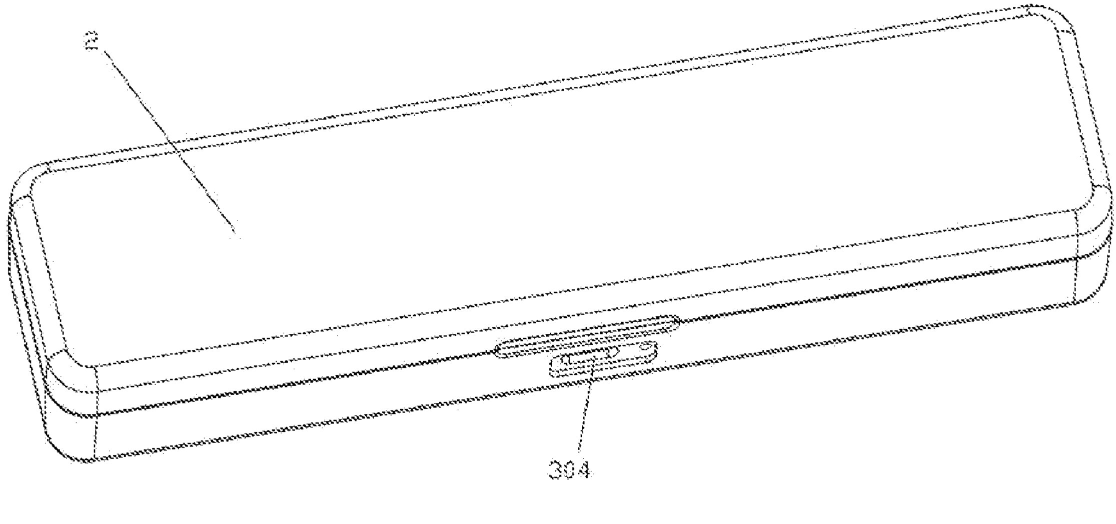
FIG. 1 is a three-dimensional diagram of the present invention.
Figure 2:
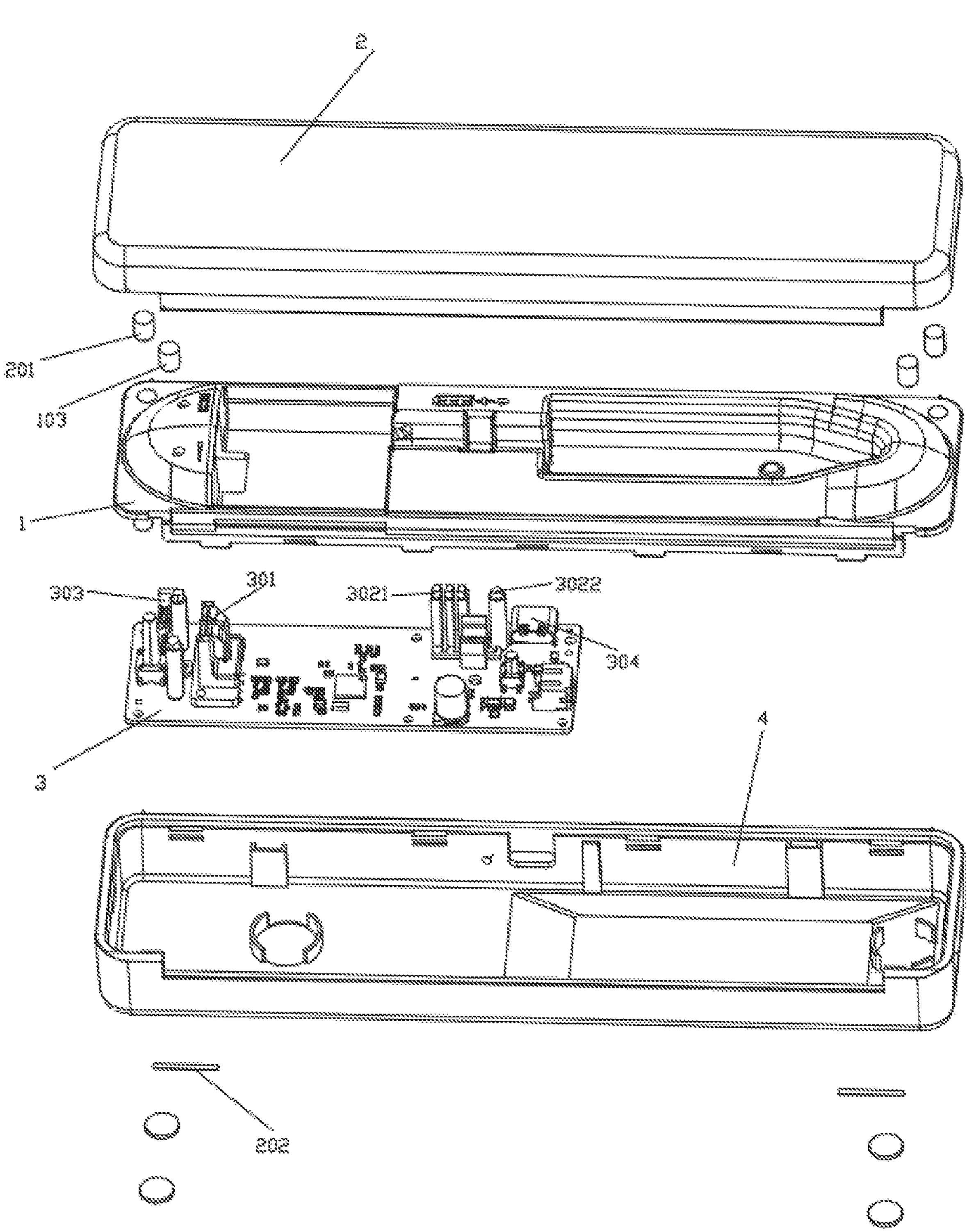
FIG. 2 is an exploded diagram of the present invention.

In the figures,

1. bracket; 101. Placement slot; 102. Elastic sheet; 103. Iron post;

2. upper shell; 201. Magnet; 202. Rotating shaft;

3. circuit board; 301. Charging elastic sheet; 302. Indicator light; 3021. Charging indicator light; 3022. Battery level indicator light; 303. Magnetic induction switch; 304. Charging interface;

4. lower shell; and

5. thermometer.

DETAILED DESCRIPTION OF THE EMBODIMENTS

The present invention will be further described in detail below with reference to the drawings and embodiments. It should be understood that the specific embodiments described here are only for explaining the present invention rather than limiting it. In addition, it should also be noted that, for ease of description, the drawings only show parts related to the present invention instead of all the structures.

In the present invention, unless explicitly stated and defined otherwise, the terms "connected with", "connected", "fixed" and the like shall be understood broadly; for example, it may be either a fixed connection or a detachable connection, or in one piece; it may be a mechanical connection, or it may be an electrical connection; it may be a direct connection or indirect connection through an intermediate medium, and may be an internal communication of two components or an interaction relationship between two components. For those skilled in the art, the specific meanings of the above terms in the invention could be understood according to a specific condition.

In the present invention, the first feature being "on" or "under" the second feature may mean that the first feature and the second feature are in a direct contact, or the first and second features may be not in a direct contact, but in an indirect contract through another feature therebetween, unless otherwise explicitly stated and defined. Moreover, the first feature being "at the top of", "above" and "on" the second feature may mean that the first feature is right above or above and to one side of the second feature, or may merely mean that the first feature is horizontally higher than the second feature. The first feature being "at the bottom of", "below" and "under" the second feature may mean that the first feature is below or below and to one side of the second feature, or may merely mean that the first feature is horizontally lower than the second feature.

In the description of the present invention, the orientations or positional relationships, indicated by the terms, such as "upper", "lower", "front", "rear", "left", and "right", are orientations or positional relationships shown in the drawings and are only for the purpose of facilitating and simplifying the description, rather than indicating or implying that the described device or element must have a particular orientation or must be constructed and operated in a particular orientation, and therefore they cannot be construed as limiting the present invention. In addition, the terms "first" and "second" are only used for descriptive purposes and have no special meaning.

As shown in FIGS. 1-8, the present invention provides a thermometer charging case capable of lighting up automatically, including: a bracket 1 configured to hold a thermometer 5; an upper shell 2 arranged above the bracket 1 and configured to cover the bracket 1; and a lower shell 4 arranged below the bracket 1; wherein a circuit board 3 is further arranged between the bracket 1 and the lower shell 4, and an indicator light 302 and a magnetic induction switch 303 are further arranged on the circuit board 3; a magnet 201 is further arranged on a lower side of the upper shell 2 at a position corresponding to the magnetic induction switch 303; in a case where the upper shell 2 is closed downward, the magnet 201 is close to the magnetic induction switch 303, the magnetic induction switch 303 is turned off, and the indicator light 302 is out; in a case where the upper shell 2 is opened upward, the magnet 201 is away from the magnetic induction switch 303, the magnetic induction switch 303 is turned on, and the indicator light 302 is on.

The circuit board is provided with a fault diagnosis module, and the fault diagnosis module includes:

a vibration sensor, configured to measure a vibration signal of a charging case body, an input end of the vibration sensor being connected to a drive charging case of the charging case body, wherein an original mechanical quantity to be measured of the charging case body is used as an input quantity of the vibration sensor, and is then received by a mechanical receiving port to form another mechanical quantity suitable for conversion, and finally, the electromechanical conversion part converts the other mechanical quantity into electricity;

in a specific embodiment, the vibration sensor is a sensor capable of detecting vibrations of an object and converting the vibrations into electrical signal outputs. Common vibration sensors include mechanical vibration sensors and electronic vibration sensors. A mechanical vibration sensor mainly detects vibrations by sensing the vibrations of a vibration plate and an elastic element, while an electronic vibration sensor detects vibrations by sensing the resistance change of an elastic element. The vibration sensor is able to detect tiny vibrations and convert the vibrations into electrical signal outputs, providing reliable data support for various applications and being implementable.

an electrical sensor, configured to measure an electrical signal of the charging case body, the electrical sensor including an energy storage circuit and a detection circuit, one end of the energy storage circuit being configured to receive an output voltage, current and power of a generator of the charging case body, the detection circuit being connected to the other end of the energy storage circuit and outputting a detection voltage in response to detecting the control of the generator;

a feature extraction module, configured to extract features of the electrical signal and the vibration signal, and combine the features to determine fault diagnosis parameters of the charging case body;

a computing module, configured to compute a signal frequency range and obtain fault diagnosis data of the charging case body, the computing module adopting an improved filtering wavelet algorithm based on uncertainty matrix theory to realize a particle filtering state estimator of the charging case body and evaluating the fault of the charging case according to a difference between an estimated value and an actual value of a state variable; and a communication module configured to transmit the fault diagnosis data of the charging case body to a remote user mobile phone end by way of Zigbee wireless communication;

wherein an output end of a power train device in the charging case body is connected to the input end of the vibration sensor, an output end of the generator in the charging case body is connected to an input end of the electrical sensor, an output end of the vibration sensor is connected to an input end of the feature extraction module, an output end of the electrical sensor is connected to the input end of the feature extraction module, the output end of the feature extraction module is connected to an input end of the computing module, and the output end of the computing module is connected to an input end of the communication module.

Figures 3, 4:
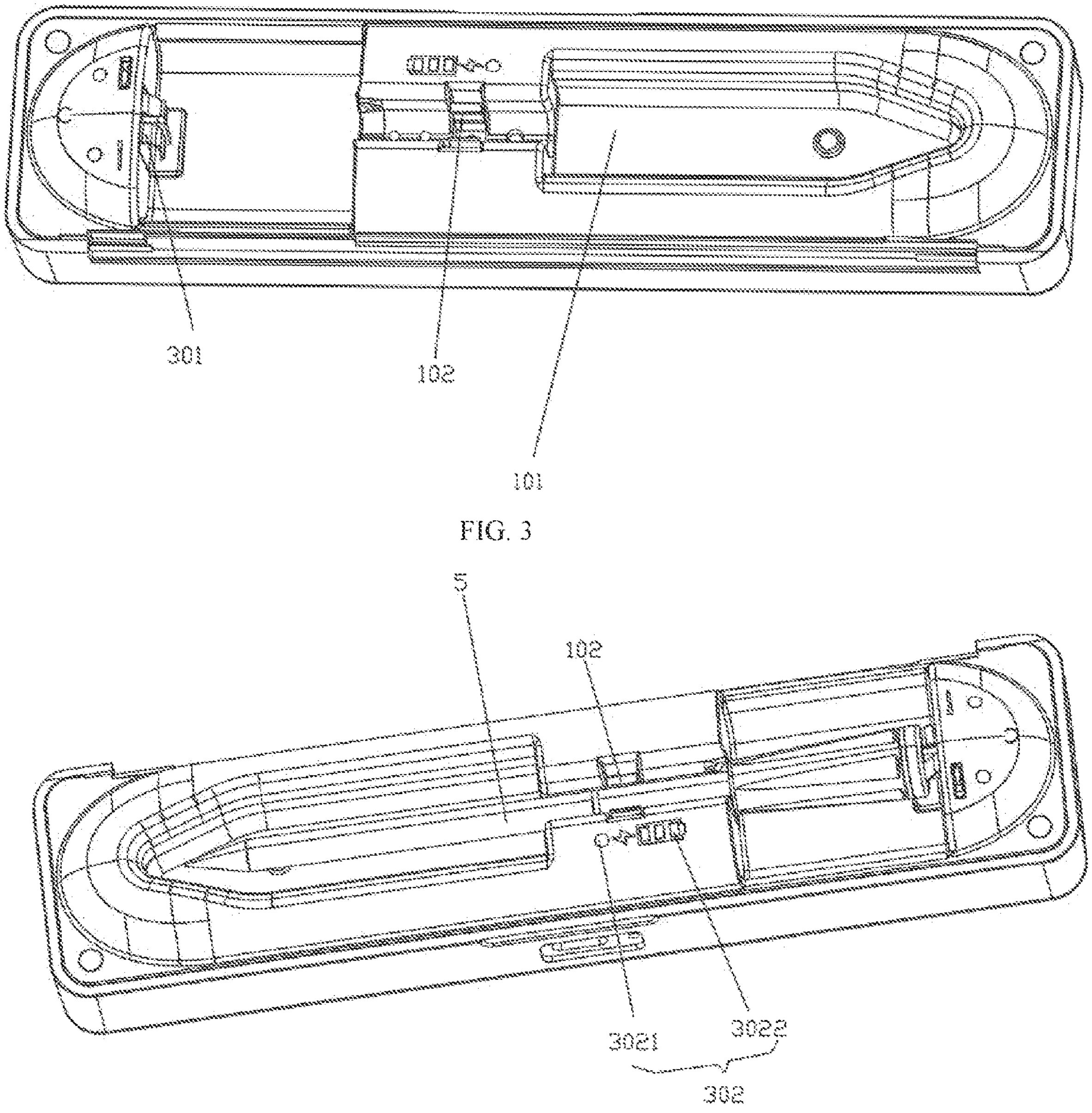
FIG. 3 is a three-dimensional diagram of the present invention with an upper shell removed.
FIG. 4 is a schematic diagram of a charging case of the present invention in the event of charging a thermometer.
Figure 5:
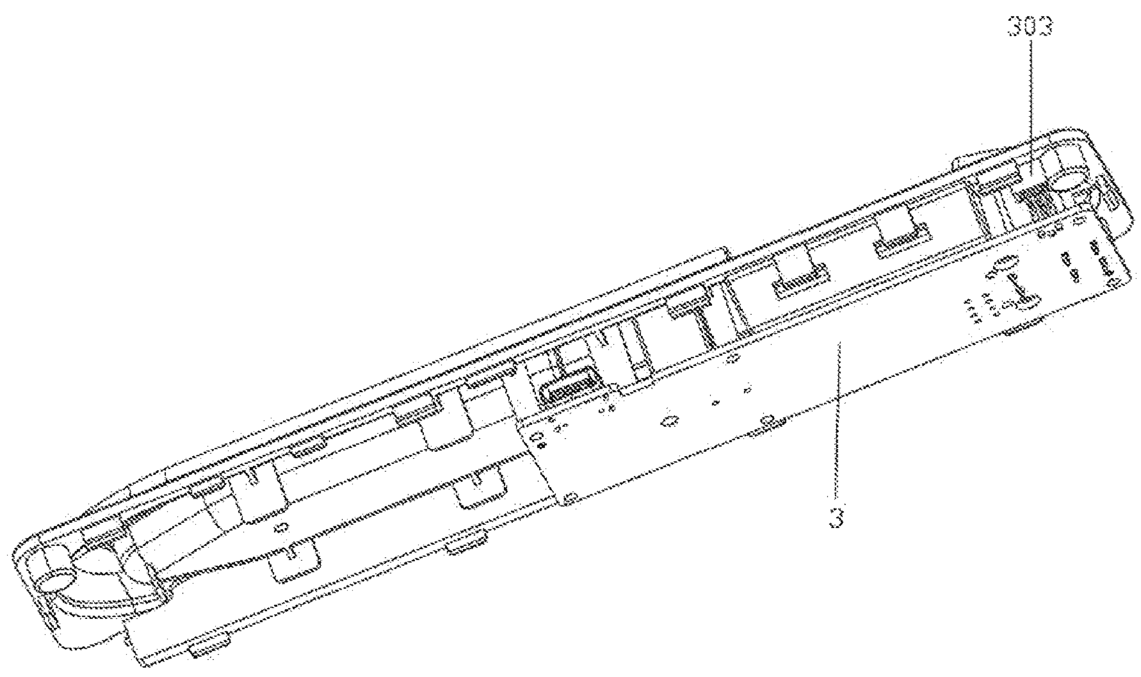
FIG. 5 is a three-dimensional diagram of the present invention with upper and lower shells removed.
Figure 6:
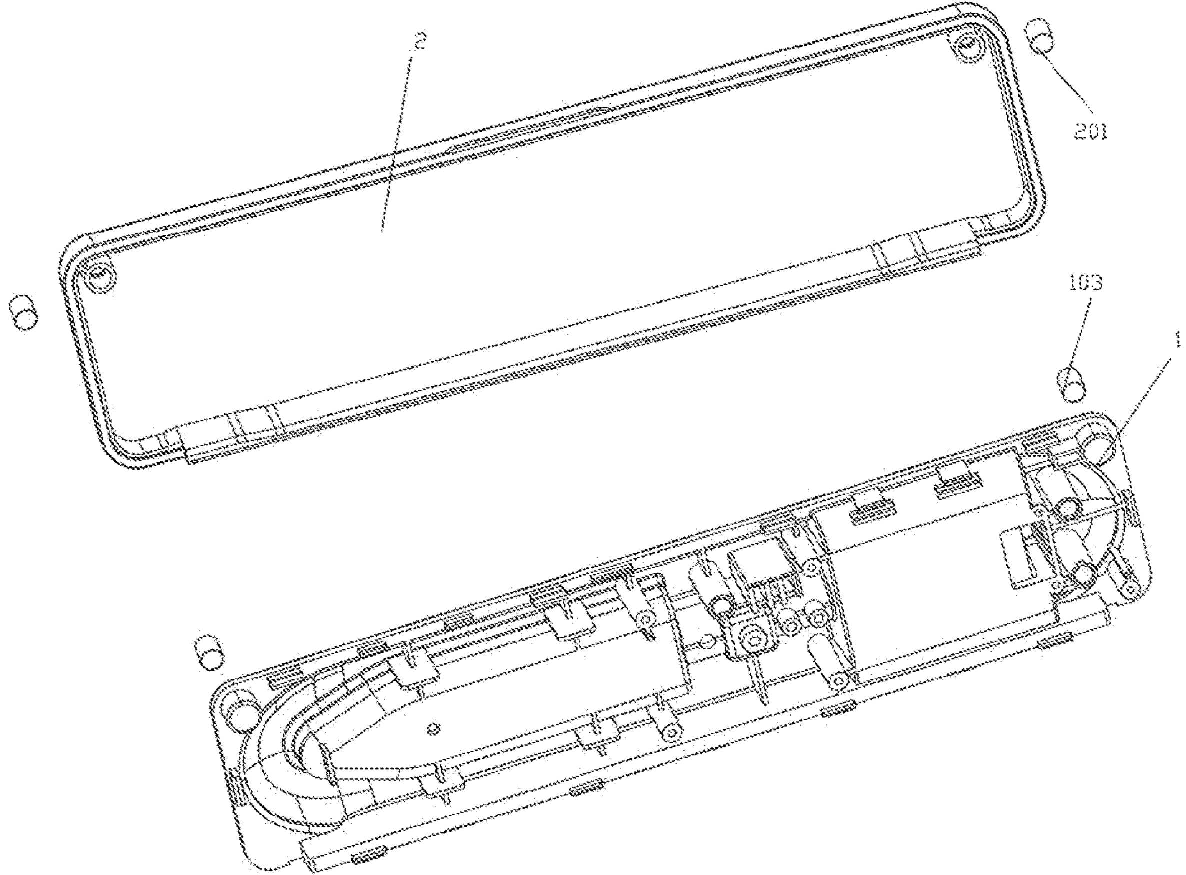
FIG. 6 is a position relational diagram of a magnet installed on the upper shell and an iron post arranged on a bracket according to the present invention.
Figure 7:
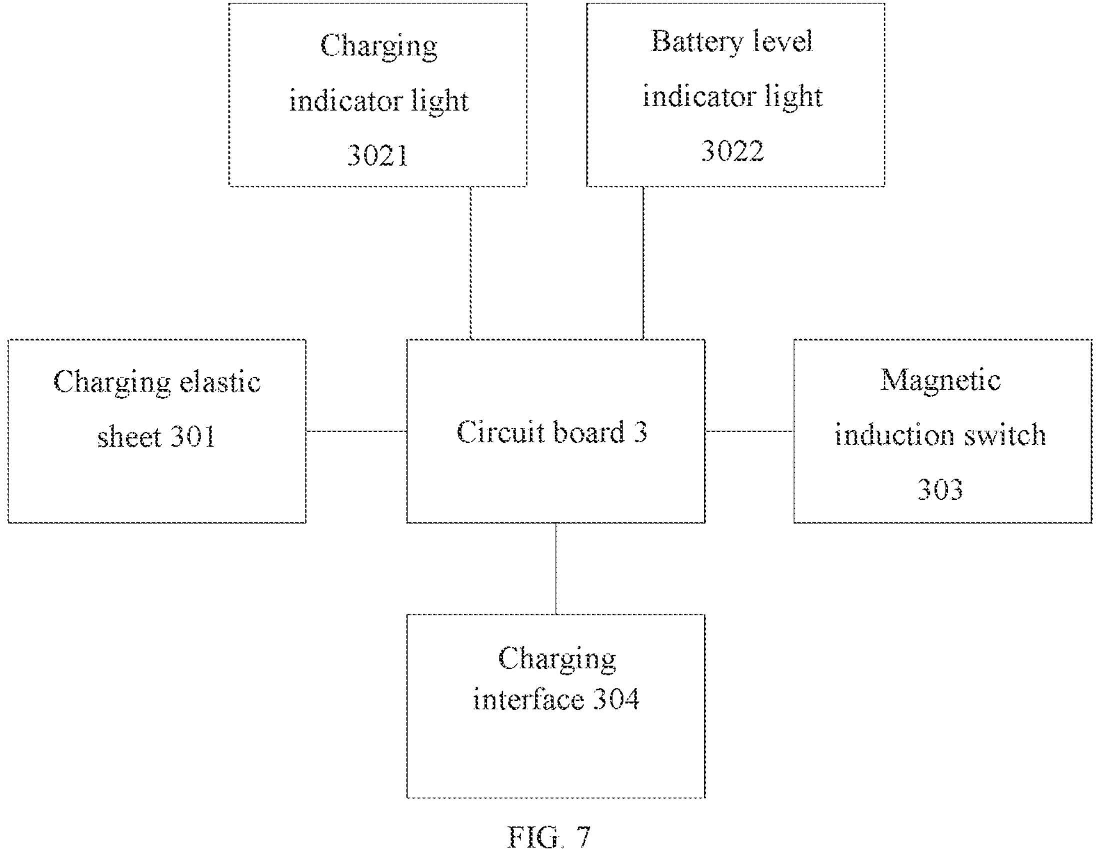
FIG. 7 is an electrical connection diagram of the present invention.
Figure 8:
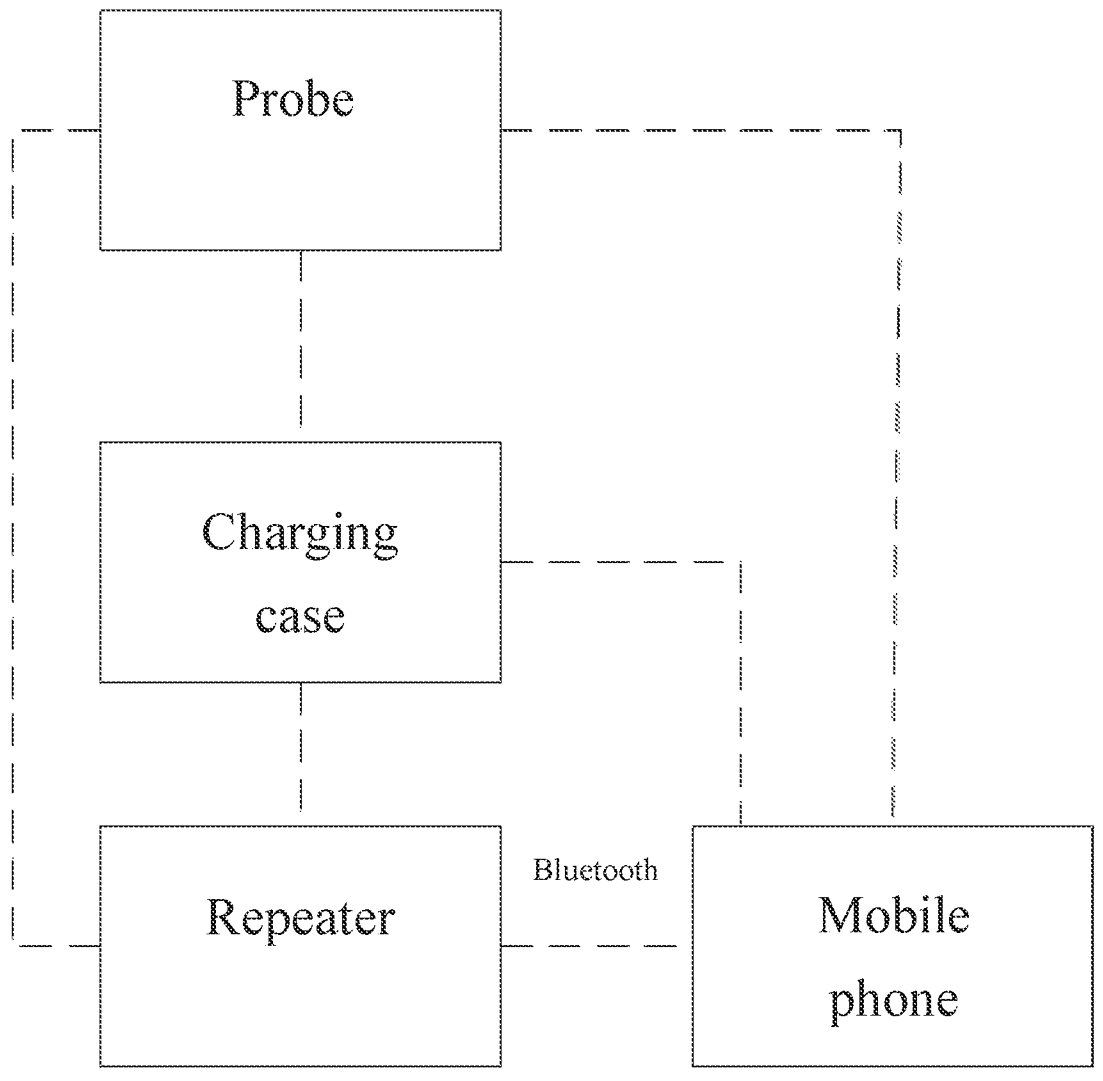
FIG. 8 is a wireless connection diagram of the present invention.
Figure 9:
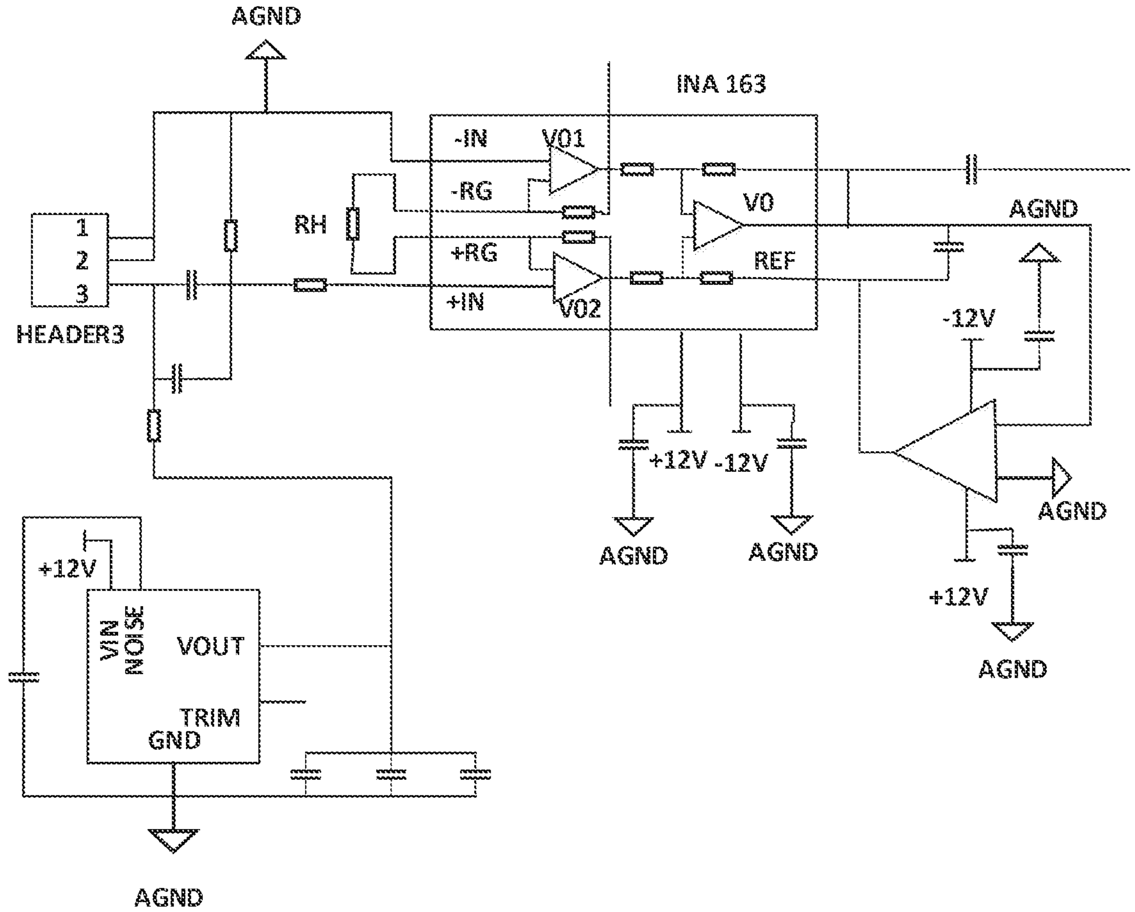
FIG. 9 is a schematic diagram of a preamplification sampling circuit according to the present invention.

In a specific embodiment, as shown in FIG. 4, the data electrical sensor includes a preamplifier circuit based on an INA163 chip. In the preamplifier circuit, in order to amplify a weak signal to a suitable voltage for sampling, the present invention arranges a preamplifier circuit based on an INA163 chip. The present invention adopts an AS-B4015AL38RC-L50 microphone with a sensitivity of −35 dB, an impedance of 2.2 KΩ, and a frequency response of 16-20 KHz. Microphone pins are connect to a peripheral bias circuit by using SMA ports. A 3.3V DC power supply is adopted. A signal channel is connected with a 0.22 uF capacitor in series to block a DC signal. An acquired photoacoustic signal is amplified and denoised by a signal processing circuit with a high gain and a denoising function, and then transmitted to a DSP chip for sampling processing. The magnification of the preamplifier circuit can be controlled and adjusted through an RH resistor, and the amplified signal enters an A/D conversion port of PCM4, and then the converted information is transmitted to the ADSP62 chip for processing. The INA162 amplifier is a device that integrates four high-precision resistor pairs and on-chip EMI filter with a low-distortion, high-output-current, and dual-channel audio operational amplifier. It has a strong suppression capability for circuit noise, a main chip operating frequency of 200 MHz, and 1024-point composite FFT execution time of 46 uS, thereby achieving a good dynamic response.

The indicator light 302 includes: a charging indicator light 3021 and battery level indicator lights 3022. The charging indicator light 3021 is configured to show whether charging is in progress. The charging indicator light 3021 is on in a case of charging and the charging indicator light 3021 is off in a case of full battery. Three battery level indicator lights 3022 are provided to respectively display three battery levels of 1/3, 2/3, and 3/3.

An upper surface of the bracket 1 is further provided with a placement slot 101 for placing the thermometer 5. One side of a charging slot is provided with a charging elastic sheet 301 electrically connected to the circuit board 3 to charge the thermometer 5. The other side of the charging slot is further provided with an ultraviolet disinfection lamp for sterilizing and disinfecting the thermometer 5. After the lid is opened, the ultraviolet lamp is turned off through the magnetic induction switch 303. After the lid is opened, the ultraviolet lamp is turned on for disinfection through the magnetic induction switch to prevent the ultraviolet lamp from causing harm to the human body.

An iron post 103 is further arranged on the bracket 1 at a position corresponding to the magnet 201 arranged on the upper shell 2 and is configured to magnetically attract the case lid. An elastic sheet 102 is further arranged in the placement slot 101 to fix the thermometer 5. The upper shell 2 is rotatably installed on the bracket 1 through a rotating shaft 202. The circuit board 3 is further provided with a charging interface 304, and at a corresponding position on a side wall of the lower shell 4, a strip-shaped opening is formed for connection with a power supply. The placement slot 101 is thin in the middle and thick at two ends, and the elastic sheet 102 is installed at the thin part in the middle and is thick at two ends, which is convenient for taking and placing the thermometer 5.

The principle of the present invention is as follows:

An iron post 103 is further arranged on the bracket 1 at a position corresponding to the magnet 201 arranged on the upper shell 2 and is configured to magnetically attract the case lid.

A circuit board 3 is further arranged between the bracket 1 and the lower shell 4, and an indicator light 302 and a magnetic induction switch 303 are further arranged on the circuit board 3. A magnet 201 is further arranged on a lower side of the upper shell 2 at a position corresponding to the magnetic induction switch 303. In a case where the upper shell 2 is closed downward, the magnet 201 is close to the magnetic induction switch 303, the magnetic induction switch 303 is turned off, and the indicator light 302 is out. In a case where the upper shell 2 is opened upward, the magnet 201 is away from the magnetic induction switch 303, the magnetic induction switch 303 is turned on, and the indicator light 302 is on.

The indicator light 302 includes: a charging indicator light 3021 and battery level indicator lights 3022. The charging indicator light 3021 is configured to show whether charging is in progress. The charging indicator light 3021 is on in a case of charging and the charging indicator light 3021 is off in a case of full battery. Three battery level indicator lights 3022 are provided to respectively display three battery levels of 1/3, 2/3, and 3/3.

A probe is connected to the charging case via Bluetooth, and a mobile phone is connected to a repeater via Bluetooth.

The feature extraction module includes a reading module, a sampling module, a dividing module, a construction module and a fusion module, wherein the reading module reads electrical signals and vibration signals from a data set, converts the electrical signals and the vibration signals into electrical data and vibration data through A/D conversion to obtain a class label included in each piece of data; the sampling module randomly samples the class labels included in the data obtained by the reading module to obtain a feature template; the dividing module translates and rotates template point clouds obtained by the sampling module to obtain source point clouds, and divides the source point cloud and the template point cloud into a training set and a test set according to the class labels of the point clouds; the construction module computes loss functions based on respective point cloud registration models of the electrical data and the vibration data; the fusion module fuses the electrical data loss function and the vibration data loss function to obtain the fault diagnosis parameters of the charging case body.

In a specific embodiment, the reading module reads data features, reads electrical signals and vibration signals from the data set, and may be provided with a data information output interface.

In a specific embodiment, the sampling module reads and processes the data information in the data set by setting the sampling parameters, through the sampling circuit or by extracting the information category of the features of the data information.

In specific embodiments, the dividing module can perform information processing through a piece of code, a function, a class, a module or the like according to data information parameters, data feature values, data information, and the like. In a case of module dividing, the functions and roles of modules need to be considered in order to combine the modules into a complete application or system. In the meanwhile, dependencies between modules also need to be considered to ensure that the modules can work together and achieve the desired effect. In a case of information dividing, the information processing capability may be improved.

In specific embodiments, the construction module may be a module that assembles different components or elements together to create a new product. In computer programming, the construction module may usually refer to a module used to create a specific type of data structure or algorithm. In the present invention, a data structure may be defined by creating a data structure, such as an array, a linked list or a structure, and its creation and operation can be realized. Information construction is carried out through construction rules, such as classification rules, association rules, sorting algorithms or search algorithms, to perform specific operations. By combining sub-modules, other construction modules are combined together to create new data structures or algorithms. In this way, new data structures or algorithm instances are created to create different types of data structures or algorithm instances. A data structure or algorithm instance with specific properties then can be implemented. In further specific embodiments, a data construction model can be enhanced by constructing inventive parameter types.

In a specific embodiment, the fusion module controls data information through PLC (Programmable Logic Control) to improve data information fusion capabilities and computing capabilities. During the working process, the fusion module inputs data sources, which may be different needs coming from the charging case, such as data information about different states of the charging case, and then further carries out data cleaning and preprocessing, which usually involves processing such as data cleaning, deduplication, and format conversion, to ensure data quality. Data storage is then carried out to store the cleaned data in a data warehouse or data lake for subsequent data processing and analysis. Data analysis and modeling is then performed, which usually involves using machine learning algorithms and other data analysis techniques to analyze and model the data to discover useful information and patterns in the data. Next, data visualization and reporting are carried out. This step usually involves visualizing and reporting the analysis results so that users can better understand and utilize the data analysis results. Finally, data source management is carried out. This step usually involves managing data sources, including operations such as data acquisition, update, and deletion. Data information application capabilities can be improved through data fusion.

The improved filtering wavelet algorithm based on uncertainty matrix theory includes the following steps:

Step 1, constructing a mathematical model of uncertainty matrix theory:

$$C = \begin{pmatrix} C_1 \\ C_2 \end{pmatrix}_{(J+K)*N} \tag{1}$$

in equation (1), C represents the total matrix of the mathematical model of the uncertainty matrix theory, and $C_1$ and $C_2$ represent some of the matrices in the uncertainty matrix theory model, specifically:

$$C_1 = \begin{pmatrix} D_{11} & D_{12} & \dots & D_{1N} \\ D_{21} & D_{22} & \dots & D_{2N} \\ \vdots & \vdots & \vdots & \vdots \\ D_{J1} & D_{J2} & \dots & D_{JN} \end{pmatrix}_{J*N} \tag{2}$$

$$C_2 = \begin{pmatrix} L_{11} & L_{12} & \dots & L_{1N} \\ L_{21} & L_{22} & \dots & L_{2N} \\ \vdots & \vdots & \vdots & \vdots \\ L_{K1} & L_{K2} & \dots & L_{KN} \end{pmatrix}_{K*N} \tag{3}$$

where $\{D_1, D_2, D_3 \dots D_J\}$ in $C_1$ indicates a data set composed of elements that affect the charging case, D indicates one of the elements in the data set, the subscript indicates a serial number, it is set that there are J elements of the charging case, which are magnetic field, operating environment and weather, and N represents the number of pieces of data; $\{L_1, L_2, L_3 \dots L_K\}$ in $C_2$ represents a data set composed of elements that affect the charging case body, K represents one of the elements in the data set, and it is set that there are k elements of the charging case body;

in specific applications, data information analysis and application capabilities are improved through data information association.

Step 2, during the process of looking for factors that affect the working state of the charging case body, associating the two sets to observe the similarities or differences, and determining the elements that affect the charging case body; setting a probability density function of fault state data information of the charging case body at time t−1 as $P(x_{t-1}|y_{t-1})$, and sampling N particles with a value of $$x_{t-1}^{(i)}$$

and a weight of $$w_{t-1}^{(i)}$$

to generate a new particle used to estimate the prediction probability density $P(x_t|y_{t-1})$ of the fault state data information of the charging case body, wherein the new particle is expressed as:

$$x_{t|t-1}^{(i)} = f\left(x_{t-1}^{(i)}, w_{t-1}^{(i)}\right) \tag{4}$$

in equation (4), $$x_{t-1}^{(i)}$$

represents the value of an i-th particle at time t−1, $$w_{t-1}^{(i)}$$

represents the weight of the i-th particle at time t−1, and in a state update stage, based on historical observation values, the state at time t is predicted and after the latest observation value $y_t$ is obtained, the weight of the particle is determined and expressed as:

$$w_t^{(i)} = \frac{p(y_t \mid x_{t|t-1}^{(i)})}{\sum_{j=1}^{N} p(y_t \mid x_{t|t-1}^{(j)})} \quad (5)$$

in formula (5), $$P(y_t|x_{t|t-1}^{(i)})$$

represents a likelihood function. The particle filtering estimation is a method of estimating the values of unknown parameters or random variables using the particle filtering algorithm. The particle filtering algorithm is a non-parametric filtering algorithm based on the Monte Carlo method. It estimates the values of unknown parameters or random variables by sampling a large number of random samples and gradually updating the sampling distribution based on the sample statistics.

In particle filtering, the user uses a kernel function to describe the distribution of unknown parameters or random variable values. Next, the user multiplies the sampling distribution by the original distribution based on the kernel function through multiple samplings to obtain a new sampling distribution. Then, the user performs a weighted average on the new sampling distribution to obtain the final estimated value.

Particle filtering estimation is widely used in many fields, such as signal processing, image processing, machine learning, and statistics.

In this step, the analysis capability of the charging case body is improved by converting the macro data information of the working state of the charging case body into micro mathematical analysis, and the data information analysis capability is improved by observing historical data information and current data information. In specific applications, by data programming and code operation, the above data information may be output by way of micro-coding to improve data information computing and application capabilities.

Step 3, resampling particles, wherein in the resampling stage, the particles are resampled according to the weights of the particles, the particles with large weights are retained, the particles with small weights are removed, the degradation of the particles is reduced, the weight of the particle after resampling is 1/N, and an estimated value of the current state variable is expressed as:

$$x_t = \frac{1}{N}\sum_{i=1}^{N} Z_t^{(i)} \quad (6)$$

in equation (6), $$Z_t^{(i)}$$

represents the value of a particle at time t; through a particle filtering process, the particle filtering state estimator of the charging case body is realized, and the difference between the estimated value and the actual value of the state variable is used to warn the fault of the charging case body, a variable residual is expressed as:

$$r_t^{(l)} = y_t^{(l)} - x_t^{(l)} \quad (7)$$

in equation (7), $$y_t^{(l)}$$

represents the actual measured value of the state variable, $$x_t^{(l)}$$

represents the estimated value by particle filtering, and a multi-state variable residual is used as a fault warning indicator, which is expressed as:

$$r_t = \left|\sum_{l=1}^{m} (r_k^{(l)})\right| \quad (8)$$

in formula (8), $$r_k^{(l)}$$

represents a state residual.

Step 4, in a case where the charging case is operating normally, since some state variables are affected by load changes and the amplitude of the vibration signal is affected by a load current on a charging case conductor, the state variable residual may not be 0, which reduces errors and noise interference to the greatest extent, in a case where a fault occurs at time $t_A$, if a constant-threshold method is used, an alarm signal will be sent out at time $t_B$, resulting in false alarms. However, using an adaptive-threshold method can effectively prevent other interference factors from affecting the change of variable residuals, thereby ensuring that the fault alarm function of the charging case is more accurate; the confidence and confidence level of the adaptive threshold satisfy:

$$p\{\overline{\mu} - z\alpha < \mu < \overline{\mu} + z\alpha\} = 1 - \alpha \quad (9)$$

in equation (9), α represents the confidence level, 1-α represents the confidence, and Z represents a correlation coefficient.

In a specific embodiment, the confidence level refers to the degree of confidence in the predictions of models in machine learning. The confidence level is usually expressed as a score between 0 and 1, where 0 means being completely uncertain about the predictions of models and 1 means being completely certain about the predictions of models.

In practical applications, the confidence level is usually selected according to specific application scenarios and requirements. In addition, the selection of confidence level is also related to the complexity of the model and the training data. Models with high complexity may have some uncertainty in their predictions and therefore require a high confidence level to reduce this uncertainty. The quality of training data also affects the selection of confidence level. Because noise and errors present in the training data may have an impact on the predictions of models, a high confidence level is needed to reduce this impact.

In the above embodiment, the filtering wavelet algorithm is an image processing algorithm widely used in the field of digital signal processing. Based on the concepts of Fourier transform and wavelet transform, it can compress and denoise original image information while retaining the original image information. The filtering wavelet algorithm can be applied to image enhancement, image denoising and compression and other aspects of processing.

The core concept of the filtering wavelet algorithm is to decompose the original image into different frequency components and process each component using a fixed set of filters. These filters may be set according to different frequencies and signal-to-noise ratios to achieve different filtering effects. By performing multi-layer filtering on the original image, the image information at different frequencies can be extracted step by step, so as to realize the denoising and enhancement processing of the image.

The filtering wavelet algorithm has the advantages of fast image processing and simple algorithm, so it has been widely used in many digital image processing fields. However, there are also disadvantages that a large amount of computations are involved and the result is obviously affected by the filter parameters, so it needs to be selected according to the specific application scenarios.

In a specific embodiment, the uncertainty matrix theory, as an important concept in probability theory, is used to describe the probability distribution of possible values of random variables in an uncertain environment.

In the probability theory, a random variable refers to an observed result in a randomized experiment, such as the number of points in a die roll, the suit of a poker card taken. Since the value of an observed random variable is random, the user cannot determine its specific value.

The uncertainty matrix theory provides a way to describe uncertainty. That is, possible values of a random variable are expressed as a matrix, and each element represents the probability of the possible value of the random variable.

The uncertainty matrix theory is of great significance in many fields, such as quantum mechanics, statistics, and finance. In practical applications, people often need to consider uncertain factors to ensure the reliability and safety of decision-making.

The above description is only preferred embodiments of the present invention and is not intended to limit the scope of the present invention. Any equivalent structural transformations made under the inventive concept of the present invention using the description and drawings of the present invention, or directly/indirectly applied in other related technical fields are included in the protection scope of the present invention.

What is claimed is:

1. A thermometer charging case capable of lighting up automatically, comprising:

a bracket configured to hold a thermometer;

an upper shell arranged above the bracket and configured to cover the bracket; and a lower shell arranged below the bracket;

wherein a circuit board is further arranged between the bracket and the lower shell, and an indicator light and a magnetic induction switch are further arranged on the circuit board; a magnet is further arranged on a lower side of the upper shell at a position corresponding to the magnetic induction switch;

in a case where the upper shell is closed downward, the magnet is adjacent to the magnetic induction switch, the magnetic induction switch is turned off, and the indicator light is out;

in a case where the upper shell is opened upward, the magnet is away from the magnetic induction switch, the magnetic induction switch is turned on, and the indicator light is on;

wherein the circuit board is provided with a fault diagnosis module, wherein the fault diagnosis module comprises:

a vibration sensor, configured to measure a vibration signal of a charging case body, an input end of the vibration sensor being connected to a drive charging case of the charging case body, wherein an original mechanical quantity to be measured of the charging case body is configured as an input quantity of the vibration sensor, and is received by a mechanical receiving port to form another mechanical quantity suitable for conversion, and an electromechanical conversion part converts the other mechanical quantity into electricity;

an electrical sensor, configured to measure an electrical signal of the charging case body, wherein the electrical sensor comprises an energy storage circuit and a detection circuit, a first end of the energy storage circuit is configured to receive an output voltage, current and power of a generator of the charging case body, the detection circuit is connected to a second end of the energy storage circuit and outputs a detection voltage in response to detecting a control of the generator;

a feature extraction module, configured to extract features of the electrical signal and the vibration signal, and combine the features to determine fault diagnosis parameters of the charging case body;

a computing module, configured to compute a signal frequency range and obtain fault diagnosis data of the charging case body, wherein the computing module adopts an improved filtering wavelet algorithm based on an uncertainty matrix theory to realize a particle filtering state estimator of the charging case body and evaluates a fault of the thermometer charging case according to a difference between an estimated value and an actual value of a state variable; and a communication module configured to transmit the fault diagnosis data of the charging case body to a remote user mobile phone end by way of Zigbee wireless communication;

wherein an output end of a power train device in the charging case body is connected to the input end of the vibration sensor, an output end of the generator in the charging case body is connected to an input end of the electrical sensor, an output end of the vibration sensor is connected to an input end of the feature extraction module, an output end of the electrical sensor is connected to the input end of the feature extraction module, an output end of the feature extraction module is connected to an input end of the computing module, and an output end of the computing module is connected to an input end of the communication module.

2. The thermometer charging case capable of lighting up automatically according to claim 1, wherein the indicator light comprises a charging indicator light and battery level indicator lights;

the charging indicator light is configured to show whether charging is in progress;

the charging indicator light is on in a case of charging and the charging indicator light is off in a case of full battery;

three battery level indicator lights are provided to respectively display three battery levels of 1/3, 2/3, and 3/3.

3. The thermometer charging case capable of lighting up automatically according to claim 1, wherein an upper surface of the bracket is further provided with a placement slot for placing a thermometer;

one side of a charging slot is provided with a charging elastic sheet electrically connected to the circuit board to charge the thermometer.

4. The thermometer charging case capable of lighting up automatically according to claim 1, wherein an iron post is further arranged on the bracket at a position corresponding to the magnet arranged on the upper shell and is configured to magnetically attract a case lid.

5. The thermometer charging case capable of lighting up automatically according to claim 3, wherein an elastic sheet is further arranged in the placement slot to fix the thermometer.

6. The thermometer charging case capable of lighting up automatically according to claim 1, wherein the upper shell is rotatably installed on the bracket through a rotating shaft.

7. The thermometer charging case capable of lighting up automatically according to claim 1, wherein the circuit board is further provided with a charging interface, and at a corresponding position on a side wall of the lower shell, a strip-shaped opening is formed for connection with a power supply.

8. The thermometer charging case capable of lighting up automatically according to claim 5, wherein the placement slot is thin in the middle and thick at two ends, and the elastic sheet is installed at a thin part in the middle and is thick at two ends to be convenient for taking and placing the thermometer;

a probe is connected to the charging case via Bluetooth, and a mobile phone is connected to a repeater via Bluetooth.

9. The thermometer charging case capable of lighting up automatically according to claim 1, wherein the feature extraction module comprises a reading module, a sampling module, a dividing module, a construction module and a fusion module, wherein the reading module reads electrical signals and vibration signals from a data set, converts the electrical signals and the vibration signals into electrical data and vibration data through A/D conversion to obtain a class label comprised in each piece of data;

the sampling module randomly samples the class labels comprised in the data obtained by the reading module to obtain a feature template;

the dividing module translates and rotates template point clouds obtained by the sampling module to obtain source point clouds, and divides the source point cloud and the template point cloud into a training set and a test set according to the class labels of the point clouds;

the construction module computes loss functions based on respective point cloud registration models of the electrical data and the vibration data; and the fusion module fuses an electrical data loss function and a vibration data loss function to obtain the fault diagnosis parameters of the charging case body.

10. The thermometer charging case capable of lighting up automatically according to claim 1, wherein the improved filtering wavelet algorithm based on the uncertainty matrix theory comprises the following steps:

step 1, constructing a mathematical model of the uncertainty matrix theory:

$$C = \begin{pmatrix} C_1 \\ C_2 \end{pmatrix}_{(J+K)*N} \tag{1}$$

in equation (1), C represents a total matrix of the mathematical model of the uncertainty matrix theory, and $C_1$ and $C_2$ represent some of matrices in an uncertainty matrix theory model, specifically:

$$C_1 = \begin{pmatrix} D_{11} & D_{12} & \dots & D_{1N} \\ D_{21} & D_{22} & \dots & D_{2N} \\ \vdots & \vdots & \vdots & \vdots \\ D_{J1} & D_{J2} & \dots & D_{JN} \end{pmatrix}_{J*N} \tag{2}$$

$$C_2 = \begin{pmatrix} L_{11} & L_{12} & \dots & L_{1N} \\ L_{21} & L_{22} & \dots & L_{2N} \\ \vdots & \vdots & \vdots & \vdots \\ L_{K1} & L_{K2} & \dots & L_{KN} \end{pmatrix}_{K*N} \tag{3}$$

wherein $\{D_1, D_2, D_3 \dots D_J\}$ in $C_1$ indicates a data set composed of elements affecting the charging case, D indicates one of the elements in the data set, a subscript indicates a serial number, it is set that there are J elements of the charging case, the J elements are magnetic field, operating environment and weather, and N represents a number of pieces of data;

$\{L_1, L_2, L_3 \dots L_K\}$ in $C_2$ represents a data set composed of elements affecting the charging case body, K represents one of the elements in the data set, and it is set that there are k elements of the charging case body;

step 2, during the process of looking for factors affecting a working state of the charging case body, associating two sets and observing similarities or differences to determine the elements affecting the charging case body; setting a probability density function of fault state data information of the charging case body at time t−1 as $P(x_{t-1}|y_{t-1})$, sampling N particles with a value of $$x_{t-1}^{(i)}$$

and a weight of $$w_{t-1}^{(i)}$$

to generate a new particle configured to estimate the prediction probability density $P(x_t|y_{t-1})$ of the fault state data information of the charging case body, wherein the new particle is expressed as:

$$x_{t|t-1}^{(i)} = f\left(x_{t-1}^{(i)}, w_{t-1}^{(i)}\right) \tag{4}$$

in equation (4), $$x_{t-1}^{(i)}$$

represents a value of an i-th particle at time t−1, $$w_{t-1}^{(i)}$$

represents a weight of the i-th particle at time t−1, and in a state update stage, based on historical observation values, a state at time t is predicted and after the latest observation value $y_t$ is obtained, the weight of the particle is determined and expressed as:

$$w_t^{(i)} = \frac{p(y_t \mid x_{t|t-1}^{(i)})}{\sum_{j=1}^{N} p(y_t \mid x_{t|t-1}^{(i)})} \tag{5}$$

in equation (5), $$P(y_t|x_{t|t-1}^{(i)})$$

represents a likelihood function;

step 3, resampling particles, wherein in the resampling stage, the particles are resampled according to the weights of the particles, the particles with large weights are retained, the particles with small weights are removed, a degradation of the particles is reduced, the weight of the particle after resampling is 1/N, and an estimated value of a current state variable is expressed as:

$$x_t = \frac{1}{N}\sum_{i=1}^{N} Z_t^{(i)} \tag{6}$$

in equation (6), $$Z_t^{(i)}$$

represents a value of a particle at time t; through a particle filtering process, the particle filtering state estimator of the charging case body is realized, and the difference between the estimated value and the actual value of the state variable is configured to warn a fault of the charging case body, a variable residual is expressed as:

$$r_t^{(l)} = y_t^{(l)} - x_t^{(l)} \tag{7}$$

in equation (7), $$y_t^{(l)}$$

represents the actual measured value of the state variable, $$x_t^{(l)}$$

represents the estimated value by particle filtering, and a multi-state variable residual is configured as a fault warning indicator and is expressed as:

$$r_t = \left|\sum_{l=1}^{m} (r_k^{(l)})\right| \tag{8}$$

in formula (8), $$r_k^{(l)}$$

represents a state residual; and step 4, in a case where the charging case is operating normally, since some state variables are affected by load changes and an amplitude of the vibration signal is affected by a load current on a charging case conductor, the state variable residual may not be 0 to reduce errors and a noise interference to the greatest extent, in a case where a fault occurs at time $t_A$, if a constant-threshold method is configured, an alarm signal will be sent out at time $t_B$, resulting in false alarms; However, using an adaptive-threshold method is allowed to effectively prevent other interference factors from affecting a change of variable residuals, thereby ensuring that a fault alarm function of the charging case is more accurate; a confidence and confidence level of an adaptive threshold satisfy:

$$p\{\overline{\mu} - z\alpha < \mu < \overline{\mu} + z\alpha\} = 1 - \alpha \tag{9}$$

in equation (9), α represents the confidence level, 1-α represents the confidence, and Z represents a correlation coefficient.

* * * * *